(12) United States Patent
Kermiche et al.

(10) Patent No.: US 6,611,396 B1
(45) Date of Patent: Aug. 26, 2003

(54) DISK LEVEL SERVO WRITE

(75) Inventors: Noureddine Kermiche, Denver, CO (US); Bruce D. Emo, Boulder, CO (US); John P. Squires, Boulder, CO (US)

(73) Assignee: Mobile Storage Technology, Boulder, CO (US)

( * ) Notice: Subject to any disclaimer, the term of this patent is extended or adjusted under 35 U.S.C. 154(b) by 0 days.

(21) Appl. No.: 09/557,401

(22) Filed: Apr. 24, 2000

(51) Int. Cl.$^7$ ................................. G11B 5/596
(52) U.S. Cl. ..................................... 360/77.04
(58) Field of Search .................... 360/77.04, 77.05, 360/75, 97.01; 711/162

(56) References Cited

U.S. PATENT DOCUMENTS

| | | | | |
|---|---|---|---|---|
| 5,109,307 A | * | 4/1992 | Sidman .................... 360/77.05 |
| 5,124,987 A | * | 6/1992 | Milligan et al. ................. 714/7 |
| 5,315,372 A | | 5/1994 | Tsai ............................ 356/358 |
| 5,539,714 A | | 7/1996 | Andrews, Jr. et al. ... 369/44.26 |
| 5,541,784 A | * | 7/1996 | Cribbs et al. .................. 360/75 |
| 5,774,294 A | | 6/1998 | Fioravanti .................... 360/75 |
| 5,796,541 A | | 8/1998 | Stein et al. .................... 360/75 |
| 5,930,067 A | | 7/1999 | Andrews et al. ......... 360/77.04 |
| 5,946,157 A | | 8/1999 | Codilian et al. ............... 360/75 |
| 6,130,797 A | * | 10/2000 | Akagi et al. ............. 360/77.04 |
| 6,392,834 B1 | * | 5/2002 | Ellis ......................... 360/77.04 |
| 6,407,878 B1 | * | 6/2002 | Weichelt et al. ......... 360/97.01 |
| 6,411,459 B1 | * | 6/2002 | Belser et al. .................. 360/75 |
| 6,421,767 B1 | * | 7/2002 | Milillo et al. ................ 711/162 |

OTHER PUBLICATIONS

Messner et al., "Design of Adaptive Feedforward Algorithms Using Internal Model Equivalence", Int'l Journal of Adaptive Control and Signal Processing, vol. 9, 199–212 (1995).

\* cited by examiner

*Primary Examiner*—David Hudspeth
*Assistant Examiner*—Fred F. Tzeng
(74) *Attorney, Agent, or Firm*—George O. Saile; Stephen B. Ackerman

(57) ABSTRACT

A method for assembling and operating a fixed media hard disk drive using a disk or a stack of disks on which servo information is pre-written off the drive spindle. The disks are subsequently mounted on the drive spindle and a set of rotationally concentric "virtual tracks" for seeking and following in terms of said pre-written servo tracks are defined. The use of the concentric virtual tracks assures minimal actuator motion during drive operation and increases acceptable offtrack tolerances. The off-spindle, pre-writing of the servo information increases the efficiency of the assembly operation and reduces the clean room burden.

6 Claims, 4 Drawing Sheets

DISK LEVEL SERVO WRITE

BACKGROUND OF THE INVENTION

1. Field of the Invention

This invention is concerned with writing embedded servo disks for fixed media hard disk drives while said disks are off the drive spindle and with the techniques required for seeking and following a "virtual track" derived from the pre-written tracks but concentric with the center of rotation of the disks once they are mounted in the drive.

2. Description of the Related Art

Disk drives are magnetic data storage devices on which user created data can be written and read. Typically such drives contain one or more flat disks which rotate at high angular velocity (3600 rpm being typical) about a central spindle and on which data is encoded by magnetic read/write heads that move above the surface of the disk and are radially positioned by actuator arms. Under ideal circumstances the data written by the read/write head forms narrow circular tracks, as thin as 0.8 microns, that are concentric with the rotation axis of the spindle. During the operation of the disk drive mechanism, however, thermal and mechanical shocks and stresses can warp individual disks and also cause a disk to shift from the true center of the rotating spindle. If this occurs, an attempt by the actuator mechanism to fix the read/write head over a track that is still assumed to be circular and concentric with the spindle will not succeed and data will be read or written inaccurately. In the case where the disk slips relative to its concentric position with the spindle, a new, non-concentric circular path will form, which will overlap several of the previously written concentric paths. This displacement of concentricity is called "runout" and, when it occurs, new writes by the read/write head will overwrite previously written data. In short, accurate positioning of the read/write head becomes nearly impossible without additional information being present on the disk to guide it to the correct track positions and, when possible, to correct for runout. This information, which actuates locating and position-correcting servomechanisms within the drive unit, is called servo information and it is pre-written on the, hard disks after the drive unit is assembled, but before customer data is Written on them.

Winchester technology introduced fixed disk drives in about 1970. In the construction of these drives with embedded servos, which are essentially the drives used today, disks are mounted on the spindle, heads are mounted in the drive, the entire drive is incorporated within a device called a servo track writer. (STW) and the required servo information is then written onto the disk by the drive's own read/write heads. The degree of precision required is such that the write head must be positioned by laser interferometry or some other technique of equal precision. In this regard, Tsai (U.S. Pat. No. 5,315,372) teaches a method of constructing a servo track writing apparatus with a laser interferometer for positioning a remote servo track positioning arm. In addition, the accuracy with which the write head of the disk drive must be advanced to write each successive piece of servo data often requires the use of a mechanical "pusher block assembly" to achieve the required definition. In this regard, Fioravanti (U.S.

Patent No. 5,774,294) teaches a method for incorporating a pusher block with a tuned damper that reduces the effects of errors in the written servo data that result from resonances in the pusher block assembly.

Typically, the servo data for an embedded servo comprises a data field that identifies the track, a servo "burst" that is used to properly align the head with the track and other fields for read/write and system operation. The modern read/write head, wherein the read function and write function are performed by separate elements (eg. a magnetoresistive read head, an induction write head) that are offset from one another, requires different alignment for reading and writing. Codilian et al (U.S. Pat. No. 5,946,157) teaches a method of recording circumferentially successive servo bursts that overlap each other and allows the magnetoresistive read head to always be positioned within its linear width on one of the bursts.

The embedded servo data field and user data field of adjacent concentric tracks are radially aligned to form wedge shaped sectors, each containing a servo wedge and a data wedge. The accurate writing of the servo data requires that a clock track be written first, usually along the outside circumference (OD) of the disk. The magnetic transitions written into the clock track divide the disk into a predetermined number of angular positions. The servo information is then written synchronously with the clock track information and the servo wedges are determined by the angular partitioning produced by the clock track. In this regard, Stein et al (U.S. Pat. No. 5,796,541) teach a method of writing a clock track that is independent of variations in the spindle rotational speed.

The role of the servo track remains the same today as it was in 1970. The servomechanism attempts to follow the written servo track as closely as possible. Normal servos can eliminate approximately 90% of the tracking error usually encountered. If the runout is excessive as would be the case if the drive had been subjected to mechanical or thermal shocks, then "runout compensators" can be applied to eliminate an additional 90% of the remaining error. Andrews, Jr. et al (U.S. Pat. No. 5,539,714) teach a method for designing an "adaptive runout compensator," which provides "on-line, real-time compensation for disk runout." According to this method, the regular rotation of the off-center track (the track with runout) produces a periodic signal whose harmonics are an indication of the eccentricity of the track. The compensator compiles a given number of the harmonic coefficients (ie. does a limited spectral analysis by a method of a discrete Fourier analysis) of the signal during a predetermined number of disk rotations. These coefficients or Fourier components are then used to provide a compensating signal to the read/write head actuator for each data sector defined on the disk. In U.S. Pat. No. 5,930,067, Andrews et al teach a method of designing a multi-harmonic compensator for track following which is similar in principle to the design in U.S. Pat. No. 5,539,714, but which calculates more harmonic components to provide a more accurate degree of compensation.

Whether or not compensators are incorporated into a disk drive design, the writing of the servo information is a costly and time-consuming process. With track densities approaching 20,000 tracks per inch (TPI) and the data capacities of 2.5 inch disks approaching 10 gigabytes (GB), the time required to write the servo information is approaching 1 hour. As one might suspect from the complex designs and technologies taught in the patents cited above, the cost of the servo track writer (STW), which writes the servo information on the disks, is quite high, between $50,000 and $250,000. In all, it is a very high cost, very low throughput operation which requires a great deal of space in a cleanroom, is difficult to automate and requires a great deal of technical personnel support.

SUMMARY OF THE INVENTION

This invention teaches a method of writing servo information on loose disks rather than on disks which have already been mounted in a disk head assembly. Only after the disks have been servo- written would they be mounted on the drive spindle and only then would the read/write head and actuator mechanism be introduced. This approach greatly relieves the assembly operation and reduces the burden on the clean room. In addition, the loose-disk servo track writer (STW),would be a simpler and less costly machine to manufacture then the servo track writer presently used to write disks that are already mounted in a head assembly. It would be an easier device to maintain and would lend itself to the automated processing of disks. It is conceivable that the servo writing process could run, unattended, on a 24 hour basis. The disks could be handled in caddies, which are more space-efficient than assembled drives. A well designed loose-disk STW could simultaneously write a stack of disks and do so at high speeds with a single clock disk and dedicated write heads. It is therefore a first object of this invention to simplify, make more efficient and reduce the cost of the writing of servo data without sacrificing the capability of that data to enable the accurate location of data tracks during the normal operation of the drive. It is a second object of this invention to provide a method by which servo data can be used for the accurate reading and writing of data tracks in a way that allows the normal operating configuration of the head actuator to be one of quiescence rather than one of constantly following rotationally off-center tracks with runout.

Both objects of this invention will be achieved by the introduction and use of a novel concept, the "virtual track," which is a track followed by the read/write head that is not actually a physical locus of magnetically stored data on the disk. The virtual track is an imaginary circle centered on the actual axis of rotation of the disk and defined "virtually" by an array of stored addresses which are the intersection points of the track and the pre-written servo information patterns. Since the rotationally concentric virtual tracks are an invariant property of the mounted disk, it is their use that permits the servo data to be written in another servo track writer (STW) unit. Although the servo data is used initially to define the virtual track, the quiescent mode of the head actuator assembly ultimately verifies that definition.

The addresses used to define the virtual track can be conceived as consisting of a sequence XXX.yyy, where XXX represents the pre-written servo identification code of the particular track and yyy is the fractional track position of the intersection, which can be derived from the information stored in the servo bursts. With the virtual track as the guide for the read/write head, that head is no longer required to constantly chase after the runout tracks. The ordinary status of the head actuator is quiescence. The virtual track is followed by loading up the next track address in the stored array and finding it. In fact, the quiescence of the actuator is a measure of goodness of the virtual track as defined by its array.

Initially, a virtual track is defined at three radial positions on the disk, the inside diameter (ID), the middle diameter (MD) and the outside diameter (OD). This is done by locking on to a pre-written track and using a runout compensator to determine the harmonic components of its runout motion. Then the intermediate values are generated by interpolation.

The advantages of this invention extend to both the process of servo writing the disks and to the operation of the drive assembly once the disks are mounted within it. As already noted, the servo writing process is simplified, it can be automated and it requires a servo track writer (STW) that is much less expensive (on a per disk basis) than that presently employed. During the normal operation of the drive, the actuator is now configured to strive for minimum activity, rather than to constantly follow the runout of physical tracks. The state of normal quiescence implies that the actuator is subjected to minimal forces and accelerations, which, in turn, minimizes tracking errors associated with the inertia of the mechanism. In short, the drive is defining its own "perfect" track, then using it. Minimization of tracking errors due to the constant following of tracks with runout effectively increases acceptable offtrack tolerances, leaving more margin for error within the system.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention teaches a method for assembling and operating a fixed media hard disk drive using disks on which servo information is pre-written off the drive spindle, which are subsequently mounted on the drive spindle and on which are then defined a set of rotationally concentric "virtual tracks" for seeking and following in terms of said pre-written servo tracks. The use of virtual tracks, which are concentric with the axis of disk rotation, maintains the head actuator assembly in a quiescent mode during drive operation as opposed to track following methods of the prior art, in which the head and actuator assembly are constantly attempting to follow tracks with runout due to change in the position of the axis of rotation subsequent to the writing of servo data while the disks were mounted in the drive or non-circular anomalies written in as a result of mechanical movement during writing (i.e. bearing errors, shocks, etc.). The method of this invention not only simplifies and reduces the expense of writing servo data, it also improves the data tracking capabilities of the hard disk drive.

Figure 1:
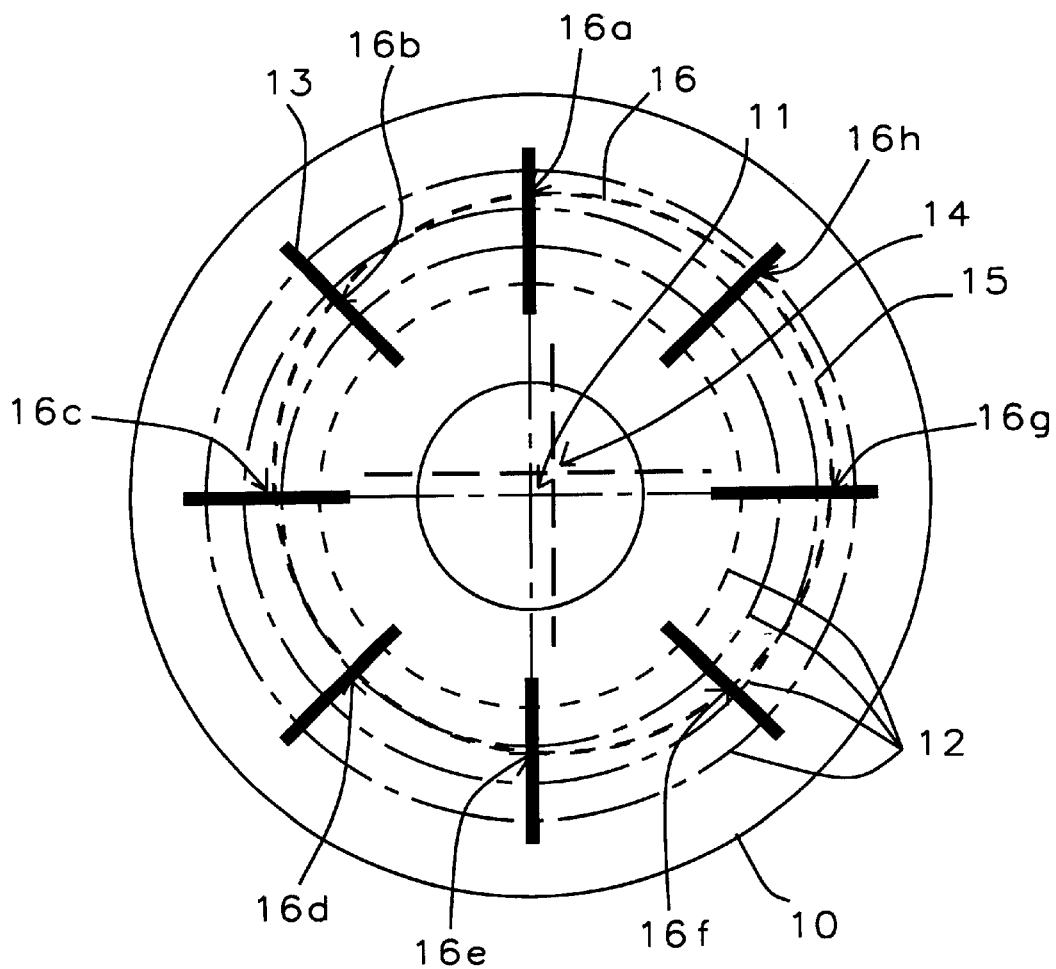
FIG. 1 shows in schematic form an overhead view of a typical disk that would be mounted in a disk drive assembly subsequent to its preparation using the methods of this invention.

Referring now to FIG. 1, there is shown in schematic form aft overhead view of a typical disk (10) that would be mounted in a disk drive assembly subsequent to its preparation using the methods of this invention. The axis of disk rotation during the initial writing of servo data in the loose disk servo track writer is shown as (11). Several typical servo track loci, written as concentric circular tracks about this axis, are indicated as (12). On an actual disk, over 20,000 such tracks are written. These pre-written servo tracks will hereinafter be referred to as "physical tracks." Also indicated are typical embedded servo sectors (13)

containing the track definition information formed by the synchronous use of a servo clock track. While only 8 sectors are shown, there are typically between 30 and 120 embedded servo sectors on a disk. Upon mounting the disk in its final disk drive assembly, the disk is assumed to have acquired a new axis of rotation (14), which is a result of the absence of alignment capability on the order of accuracy of the track pitch. In its new configuration, the method of the present invention allows the formation of a new set of tracks, the "virtual tracks," which are circular and concentric with the new rotation axis. Only one such track is pictured (15), but there are an equal number of virtual tracks and physical tracks, since the number of tracks per inch (TPI) are equal. The virtual tracks are defined by their intersection points at the servo bursts (16a–16f) with the pre-written, but now off-center, "physical" servo tracks (12). As previously noted, these defining intersections form an array of unique addresses, each of the form XXX.yyy. The locus of addresses for a virtual track is a circle (15), concentric with the new axis of rotation (14).

Figure 2:
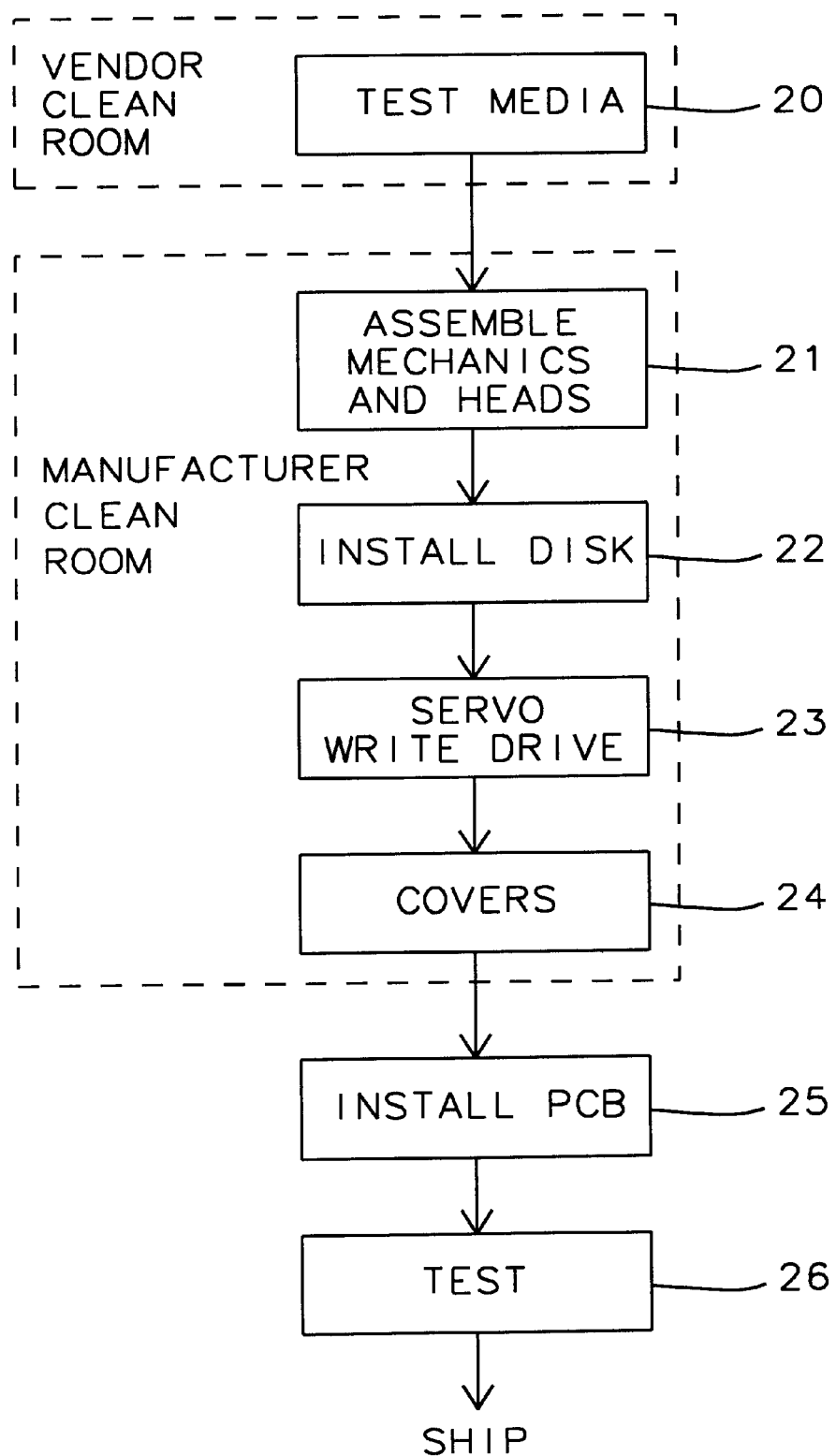
FIG. 2 is a schematic flow-chart diagram showing the disk drive assembly process typical of the prior art.

FIG. 2 is a schematic flow-chart diagram showing the disk drive assembly process typical of the prior art. Although the disk vendor tests the disks (20), the vendor does not servo write them. The steps of head assembly (21), disk installation (2) servo writing of the disks (23) and covering the drive (24), are all accomplished in the clean room environment of the drive manufacturer. Once outside the clean room, the drive unit is installed on its printed circuit board (PCB) (25), tested (26) and shipped.

Figure 3:
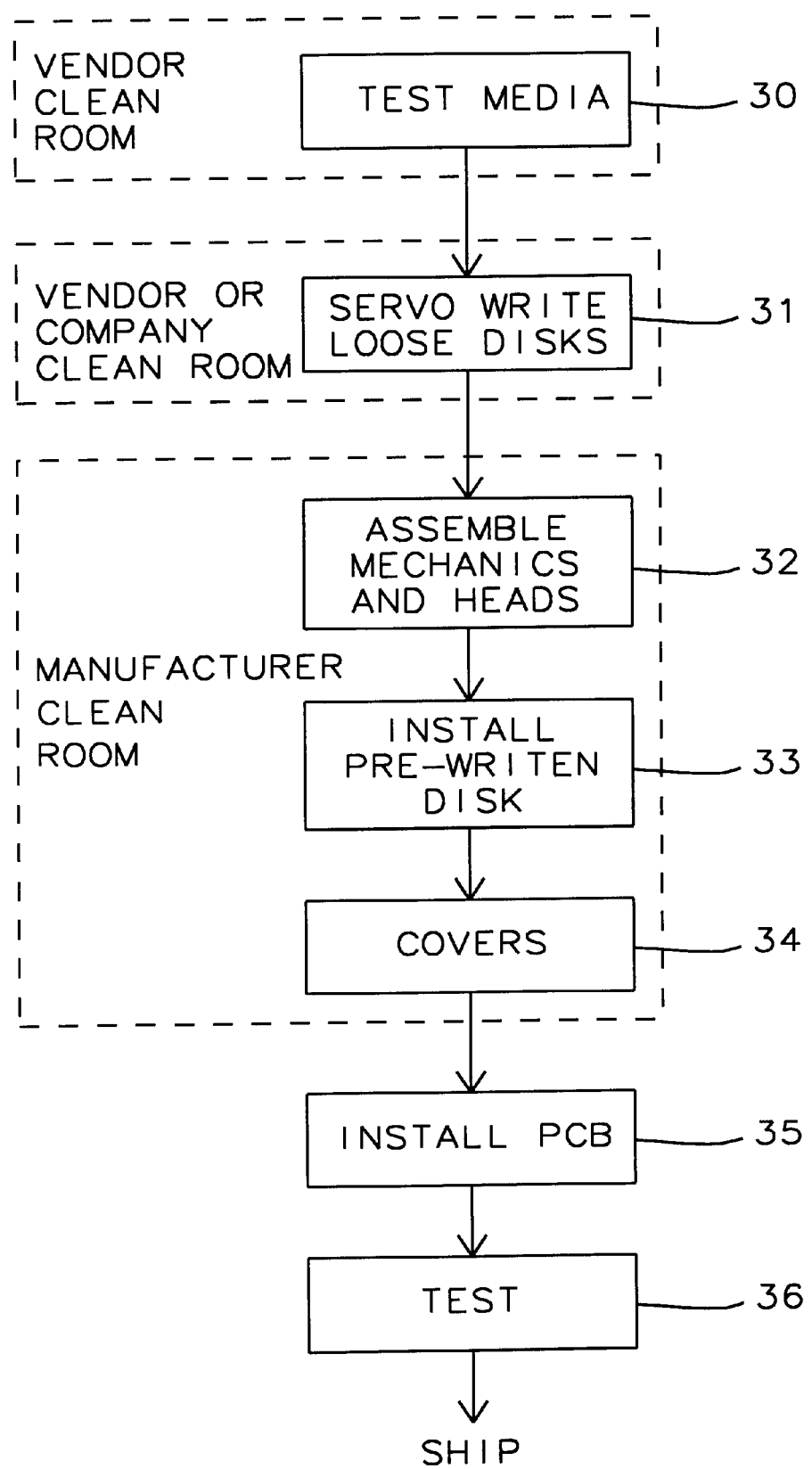
FIG. 3 is a schematic flow-chart diagram showing the disk head assembly process when practiced in accord with the methods of the present invention.

FIG. 3 is a schematic flow-chart diagram showing the disk head assembly process when practiced in accord with the methods of the present invention. The vendor tests the disks (30). The disks can now be servo- written as loose disks or as a plurality of disks arranged in a stack, either by the vendor or by the disk head assembly, manufacturer (31).

The head disk assembly now proceeds with installation of mechanics and heads, (32), installation of the pre-written disks (33) and the covering of the completed assembly (34), then exiting the clean room. The PCB is installed (35) and the assembly is tested (36) It is during this final testing procedure that the disks are calibrated and have their virtual tracks defined. This process takes only a very small time (a minute or so) compared to the overall testing of the assembly, which takes many hours.

A central aspect of the present invention is conversion of the tracking process from the physical domain to the virtual domain, so that the head assembly follows the virtual tracks rather than the pre-written physical tracks. In general, a runout of between 0 and 200 tracks will remain after the disk is mounted on the spindle. It is the task of the calibration process, which is performed as part of the assembly test process, to define the virtual track using information obtained from the runout of the physical track. Here we are guided by the approach of the "internal model principal," (IMP) as delineated by William Messner and Marc Bodson ("Design of Adaptive Feedforward Algorithms Using Internal Model Equivalence," International Journal of Adaptive Control and Signal Processing, Vol. 9, 119–212 (1995)), which in this case acts as a runout compensator (see also in this regard Andrews, Jr. et al., U.S. Pat. No. 5,539,714 and Andrews et al., U.S. Pat. No. 5,930,067, cited previously).

Figure 4:
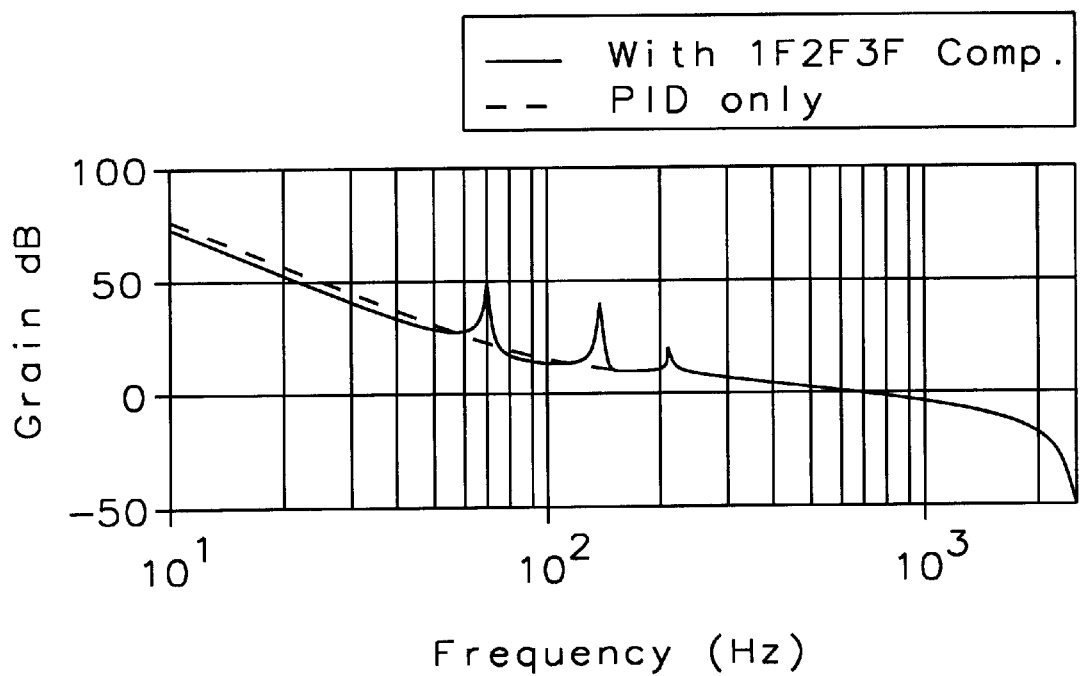
FIG. 4 is a Bode plot of the open loop transfer function showing the first, second and third harmonic peaks.

The compensator allows the harmonic content (first, second and third harmonics, or more) of the runout to be obtained. The IMP transfer function is of the form $$\frac{a}{s^2 + \omega_0^2}$$

for each harmonic, which gives infinite gain when $s=\pm j\omega_0$. FIG. 4 is a Bode plot (a plot of the ratio of servo output signal to the servo input signal) of the open loop transfer function showing the first, second and third harmonic peaks (whose mathematical form is that of the transfer function) in the gain at 70, 140 and 210 Hz, vs. the uncompensated function (PID only).

The details of the calibration process are as follows:

1. Proceed to the inside diameter (ID) and lock on to the written track there.
2. Turn on the runout compensator.
3. The position error signal (PES) with runout compensation is:

$$PES = PES_{(physical)} + 1F(t)$$

where $1F(t)$ is the first harmonic runout compensator function (very similar to a sinusoid with given magnitude and phase).

4. Transition from physical mode to virtual mode by setting:

$$PES = PES_{(physical)} - k_{1(n)}\cos(\omega_r t) - k_{2(n)}\sin(\omega_r t),$$

where: $\omega_r$=rotational frequency;
   t=time;
   and where the constants $k_1$ and $k_2$ iterate as:

$$k_{1(n)} = k_{1(n-1)} + \epsilon 1F(t)\sin(\omega_r t)$$

$$k_{2(n)} = k_{2(n-1)} + \epsilon 1F(t)\cos(\omega_r t),$$

where n=revolutions of the disk and the transition rate $\epsilon$ is a small number chosen to provide a smooth and stable transition from the physical track domain to the virtual track domain. As the values of $k_1$ and $k_2$ converge to the virtual track, the servo is following an, increasingly circular track and $1F(t)$ decays to zero as the track becomes perfectly circular.

5. You are now in the virtual track domain, wherein the position error signal is defined as:

$$PES_{(virtual)} = PES_{(physical)} - k_1 \sin(\omega_r t) - k_2 \cos(\omega_r t).$$

6. The same methodology can be used to include the higher harmonics.
7. The actuator is moved to the next location (middle of the disk, (MD)) and the entire process of steps 1 through 7 is repeated.
8. The actuator is moved to the OD and the process is again repeated.
9. A table is built using linear interpolation to determine $k_1$ and $k_2$ for all tracks.
10. The drive is transitioned to the virtual track domain wherein it remains for the remainder of its existence. "Transitioned to the virtual track domain," in this context means that tracks will no longer be defined by a servo written track with a single address (the original "physical" track, (12) in FIG. 1), but by the calculated intercepts with the pre-written servo bursts ((16a–16h)

in FIG. 1) that define a true circle about the actual axis of rotation. Each of these intercepts has been reduced to the form of a track address (XXX) and an offtrack value (yyy), whereas previously the track address was always the same and the PES was the offtrack value. The sole exception is when doing head width calibrations in the test process, whereupon the physical track with large runouts and runout compensation must be used.

The details of the seek process (locating a "target" virtual track from a present position on some given virtual track) are as follows. Everything in the seek mode is based on the distance to the target track, which is the position error signal (PES) for the target track. The velocity profile (a predetermined optimum velocity and acceleration schedule used during seeking) is based on this distance.

The rigorous definition of the distance to the target track would be:

$$PES_{(distance\ to\ target\ track)}=(\text{Virtual Target Track})-(\text{Virtual Present Track}).$$

Where the virtual tracks are defined as above:

$$PES_{(virtual)}=PES_{(physical)}-k_1\sin(\omega_r t)-k_2\cos(\omega_r t)$$

Since the sinusoidal terms of then present track are small with respect to the distance and since their calculation uses valuable processor time, we approximate the distance by:

$$PES_{(distance\ to\ target\ track)}=(\text{Virtual Target Track})-(\text{Physical Present Track}),$$

which is:

$$PES_{(distance\ to\ target\ track)}=PES_{(virtual\ target\ tracks)}-PES_{(physical\ present\ track)},$$

or:

$$PES_{(distance\ to\ target\ track)}=PES_{physical\ target\ track)}=k_1\sin(\omega_r t)-k_2\cos(\omega_r t)-PES_{(physical\ present\ track)}.$$

The track pitch of the physical and virtual tracks is the same, so no correction for differing pitches is required.

As is finally understood by a person skilled in the art, the preferred embodiment of the present invention is illustrative of the present invention rather than limiting of the: present invention. Revisions and modifications may be made to methods, constructs, materials, structures and dimensions through which is assembled and operated a fixed media hard disk drive using disks on which servo information is pre-written off the drive spindle, which are subsequently mounted on the drive spindle and on which are then defined a set of rotationally concentric "virtual tracks" for seeking and following in terms of said pre-written servo tracks in accord with the preferred embodiment of the present invention, while still providing such a fixed media hard disk drive using disks on which servo information is pre-written off the drive spindle, which are subsequently mounted on the drive spindle and on which are then defined a set of rotationally concentric "virtual tracks" for seeking and following in terms of said pre-written servo tracks in accord with the present invention as provided by the appended claims.

What is claimed is:

1. A method for assembling and operating a fixed media hard disk drive using disks on which servo information is pre-written while off the drive spindle of said hard disk drive, which disks are subsequently mounted on said drive spindle and on which are then defined a set of rotationally concentric "virtual tracks" for seeking and following in terms of said pre-written servo tracks comprising:

providing a fixed media hard disk;

mounting said disk in a servo track writing assembly dedicated to the writing of servo tracks;

writing said servo tracks on said disk;

transferring said servo-written disk to a disk drive assembly comprising a spindle, a read/write head, a head actuator assembly, and a runout compensator;

mounting said disk on said spindle of said drive assembly;

closing said disk drive assembly and mounting it on a PCB;

testing said disk drive assembly;

defining, during said testing process, a set of virtual tracks on said disk in terms of intersections between said pre-written servo tracks and circular paths of said read/write head, said intersections being obtained by means of a process comprising:

choosing a set of n different radial positions on said disk;

locking onto the written servo track at one of said radial positions;

turning on the runout compensator;

obtaining a position error signal with runout compensation included as a sum of harmonics multiplied by harmonic coefficients $k_1$ and $k_2$;

choosing a transition rate, $\epsilon$, to provide a smooth and stable transition from the physical track domain to the virtual track domain;

recording harmonic coefficients $k_1$ and $k_2$;

defining the position error signal for the virtual track in the virtual track domain;

repeating the previous six steps for each of the remaining radial positions;

creating a table in which all other virtual tracks are defined;

storing said table as a non-volatile memory array;

transitioning the disk drive to the virtual domain.

2. The method of claim 1 wherein the set of n radial positions on the disk is the set of three radial positions consisting of an inside diameter, a middle diameter and an outside diameter of the disk.

3. The method of claim 1 wherein the table is created by linear interpolation between the harmonic coefficients obtained from the n radial positions of the disk.

4. The method of claim 1 wherein higher order harmonics are obtained from the runout compensator and used to define the virtual tracks to a higher order of harmonic accuracy.

5. The method of claim 1 further including a seek mode in the virtual domain, wherein said mode locates a virtual track being sought, the target track, from a present virtual track position and computes a distance between the position of said virtual target track being -sought and a virtual present track position.

6. A fixed media hard disk drive using disks on which servo information has been pre-written off the drive spindle and on which virtual tracks are defined, comprising:

a drive spindle;

a read/write head;

a head actuator assembly;

a runout compensator a disk mounted on said drive spindle on which has been pre-written a set of servo tracks and on which is now defined a set of rotationally concentric "virtual tracks;"

an array stored in non-volatile flash memory defining said "virtual tracks" in terms of said pre-written physical servo tracks, said virtual tracks being circular tracks defined by an array of intersections of said read/write head with servo positions on said pre-written tracks and said array of intersections being obtained by an analysis of the harmonic runout components of the pre-written servo tracks using said runout compensator;

a printed circuit board on which the drive assembly is mounted.

* * * * *